United States Patent [19]
Kim

[11] Patent Number: 6,035,022
[45] Date of Patent: *Mar. 7, 2000

[54] OUTGOING CALL RESERVATION SYSTEM AND METHOD FOR FACSIMILE EQUIPMENT

[75] Inventor: Jae-Ho Kim, Kimcheon, Rep. of Korea

[73] Assignee: SamSung Electronics Co., Ltd., Suwon, Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 08/775,105

[22] Filed: Dec. 30, 1996

[30] Foreign Application Priority Data

Dec. 30, 1995 [KR] Rep. of Korea ........................ 95-67799

[51] Int. Cl.[7] .................................................. H04M 11/00
[52] U.S. Cl. ........................ 379/100.01; 379/355; 379/209
[58] Field of Search ........................ 379/100.01, 100.05, 379/100.06, 100.09, 100.12, 100.13, 100.14, 354, 355, 356, 209; 358/400, 434, 438, 440, 442, 468

[56] References Cited

U.S. PATENT DOCUMENTS

| | | |
|---|---|---|
| 4,113,991 | 9/1978 | Gorham et al. . |
| 4,741,021 | 4/1988 | Kotani et al. . |
| 4,764,951 | 8/1988 | Kotani et al. . |
| 4,794,637 | 12/1988 | Hashimoto .............................. 379/67.1 |
| 4,811,385 | 3/1989 | Watannabe . |
| 4,920,560 | 4/1990 | Kageyama . |
| 4,935,955 | 6/1990 | Neudorfer . |
| 4,956,860 | 9/1990 | Murata . |
| 4,991,203 | 2/1991 | Kakizawa ................................ 379/201 |
| 5,018,191 | 5/1991 | Catron et al. . |
| 5,101,426 | 3/1992 | Koue . |
| 5,301,035 | 4/1994 | Hayafune . |
| 5,321,741 | 6/1994 | Kaneko et al. . |
| 5,479,500 | 12/1995 | Matsuzaki et al. . |
| 5,535,266 | 7/1996 | Nishii . |
| 5,541,984 | 7/1996 | Yoshida .............................. 379/100.13 |
| 5,577,018 | 11/1996 | Mankovitz . |
| 5,577,041 | 11/1996 | Sharma et al. . |

*Primary Examiner*—Curtis A. Kuntz
*Assistant Examiner*—Melur Ramakrishnaiah
*Attorney, Agent, or Firm*—Robert E. Bushnell, Esq.

[57] ABSTRACT

An outgoing call reservation system for a facsimile equipment with an outgoing call reservation key includes: a tone detecting unit detecting a signal of a predetermined cycle received through a telephone line; a memory unit storing the number of a receiving facsimile set dialed by a transmitter; a central processing unit controlling the facsimile equipment to be in an outgoing call reservation mode by using the outgoing call reservation key when a busy-tone signal is detected by the tone detecting unit after dialing, establishing a communication path between the transmitter and the receiving set by redialing the number stored in the memory unit repeatedly at intervals of a predetermined time, and allowing a ring signal to be produced so that a document transmission or voice communication can be performed.

12 Claims, 3 Drawing Sheets

OUTGOING CALL RESERVATION SYSTEM AND METHOD FOR FACSIMILE EQUIPMENT

BACKGROUND OF THE INVENTION

1. Field of the Invention

The present invention relates generally to an outgoing call reservation for a facsimile unit. More particularly, it relates to an outgoing call-reservation system and method which allows users to set a transmission operation to be performed automatically with monitoring the state of a receiver's telephone line at intervals of a predetermined time when a user dials the number of a receiving facsimile set for document transmission or voice communication and the line is busy.

The present application is based on Korean Application No. 67799/1995 which is incorporated herein by reference.

2. Description of the Related Art

Recent technical advances and industrialization have created the enhancement of office automation. Proper use of office automation facilities is essential to an increase of operation efficiency. There are a variety of office automation facilities and business machines available in recent years, and a facsimile equipment which allows a timer operation can be one of them.

With a conventional facsimile machine, when a transmitter dials the number of a receiving facsimile set automatically and the line is not busy, the transmitting and receiving facsimile sets become linked together in answering the transmitter's signal so that the document transmission and reception is possible between them.

On the contrary, when the line is busy receiving another facsimile message or handling another voice communication, the transmitter disconnected with the receiving side, receives a busy signal that the receiving set sends back and hangs up the phone. Thus, the transmitter should wait for a prescribed period of time and redial the number repeatedly until the receiving side answers the transmitter's signal.

SUMMARY OF THE INVENTION

The present invention is directed to an outgoing call reservation mechanism for a facsimile equipment which substantially obviates the above-described problem due to limitations and disadvantages of the related art.

It is an object of the present invention to provide an outgoing call reservation system which allows a user to set an outgoing call reservation mode when the user dials the number of the receiving set for document transmission or voice communication and the line is busy and to set a transmission operation to be performed automatically as soon as the receiving set is ready for receiving.

In order to realize the above objects, the present invention provides an outgoing call reservation system for a facsimile equipment with an outgoing call reservation key, including a tone detecting unit detecting a signal of a predetermined cycle received through a telephone line; a memory unit storing the number of a receiving facsimile set dialed by a transmitter; a central processing unit controlling the facsimile equipment to be in an outgoing call reservation mode by using the outgoing call reservation key when a busy-tone signal is detected by the tone detecting unit after dialing, establishing a communication path between the transmitter and the receiving set by redialing the number stored in the memory unit repeatedly at intervals of a predetermined time, and allowing a ring signal to be produced so that a document transmission or voice communication can be performed.

As another aspect of the present invention, there is disclosed an outgoing call reservation method for a facsimile equipment including the steps of entering, storing and dialing the number of a receiving facsimile set; establishing an outgoing call reservation mode by using an outgoing call reservation key when the line is busy; redialing the number stored when the time for redialing elapses while the telephone line is cut after establishing the outgoing call reservation mode; generating a dummy ring signal after redialing; detecting if the facsimile equipment goes off-hook or not; and performing voice communication when the facsimile equipment goes off-hook.

DETAILED DESCRIPTION OF THE PREFERRED EMBODIMENT

Reference will now be made in detail to the preferred embodiment of the present invention, examples of which are illustrated in the accompanying drawings.

Figure 1:
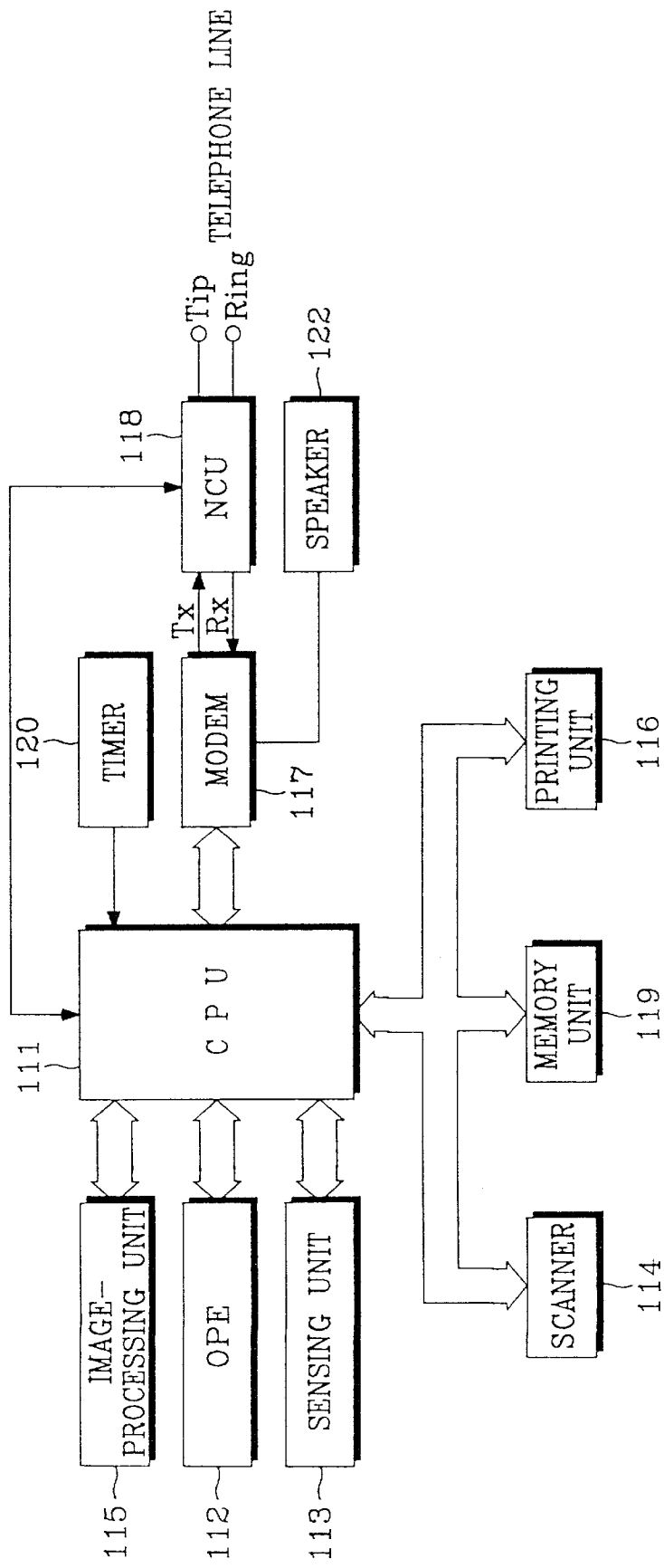
FIG. 1 is a block diagram of a facsimile equipment in accordance with the present invention.

FIG. 1 is a block diagram of a facsimile equipment in accordance with the present invention.

As shown in FIG. 1, the inventive facsimile equipment includes a central processing unit (CPU) 111 which supervises the facsimile's overall operations relating to modes of transmission, reception and duplication in accordance with a predetermined program, and controls automatic redialing of the corresponding number entered in the facsimile for outgoing call reservation so as to establish a communications link between transmitting and receiving sets, a memory unit 119 which consists of a read only memory (ROM) containing the program of the present invention and a random access memory (RAM) temporarily storing the data generated by the program performance, and an operation panel (OPE) 112 which includes a key input unit and a display.

The key input unit of the operation panel 112 is used for mode selections and mode operations, and data output by pressing the keys of the key input unit 112 is sent to the CPU 111. The display of the OPE 112 displays various messages during operation and programming.

The facsimile equipment also includes a sensing unit 113 that senses whether or not a document is input to the facsimile and whether or not paper is in a paper compartment (not shown), and produces an output signal to the CPU 111, a scanner 114 which scans the document and converts the image information into proportional digital signals, and an image-processing unit 115 which processes and encodes the signals produced by the scanner 114 in a transmission mode or a copy mode under the control of the CPU 111 according to the facsimile standard, and converts the encoded image signals received through the transmission line in a reception mode into the original image data.

In the facsimile equipment, there are a printing unit 116 which reproduces image data input from the image-processing unit 115 in the reception mode or the copy mode on printing media under the control of the CPU 111, and a modulator/demodulator (modem) 117 which converts the image data produced by the image-processing unit 115 in the transmission mode into electrical image signals under the control of the CPU 111, demodulates electrical image signals received in the reception mode so that the image-processing unit 115 can handle the signals, and detects a ring-back tone and a busy tone issued by an exchange (not shown) by way of a public switched telephone network (PSTN) and a network control unit (NCU) 118, and delivers it to the CPU 111. The NCU 118 establishes a transmission/reception path between telephone lines (tip and ring) and modem 117 under the control of the CPU 111.

Figure 2A:
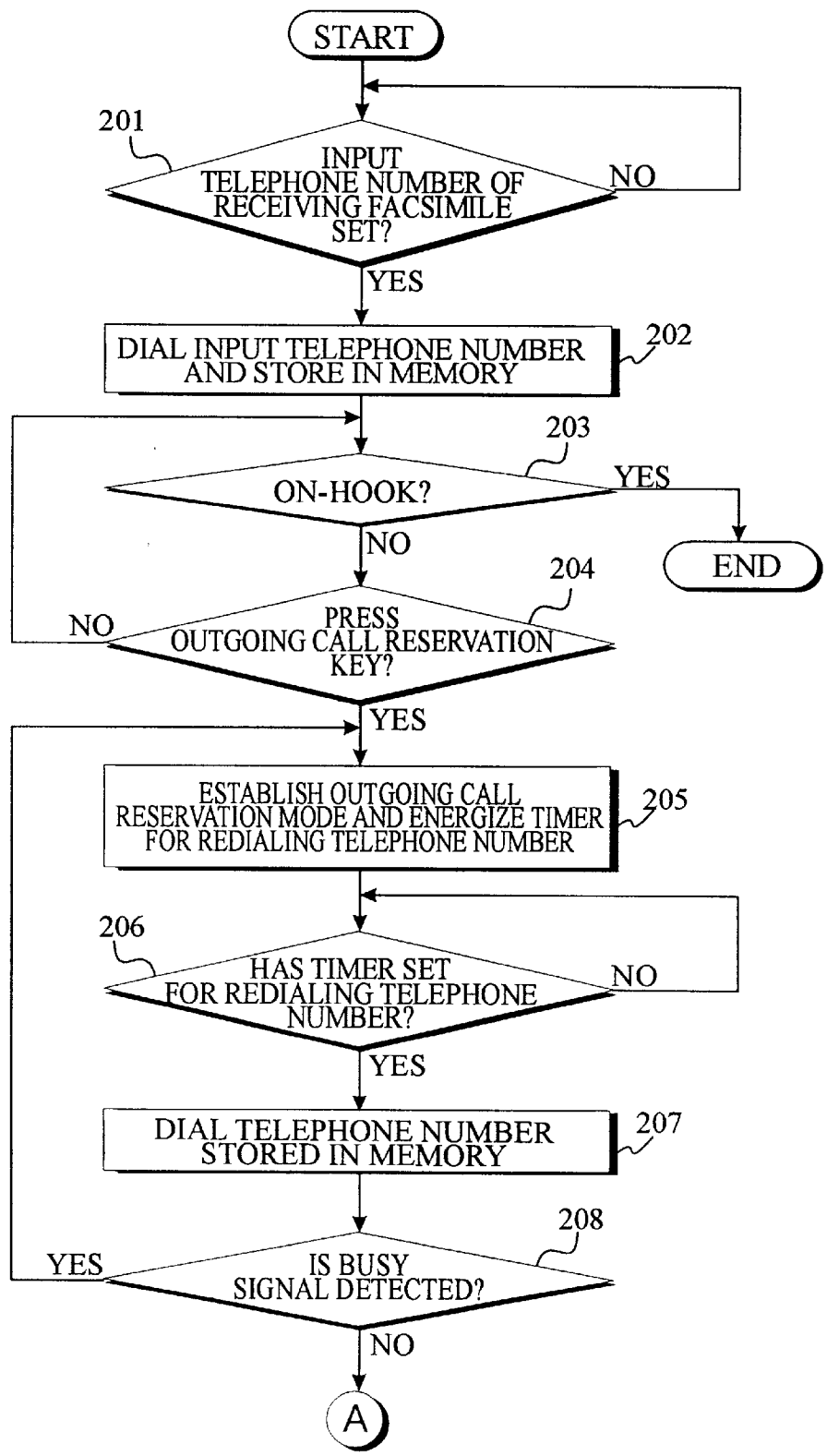
FIGS. 2A and 2B show each flow charts for describing the transmission reservation operation of a facsimile equipment in accordance with the present invention.
Figure 2B:
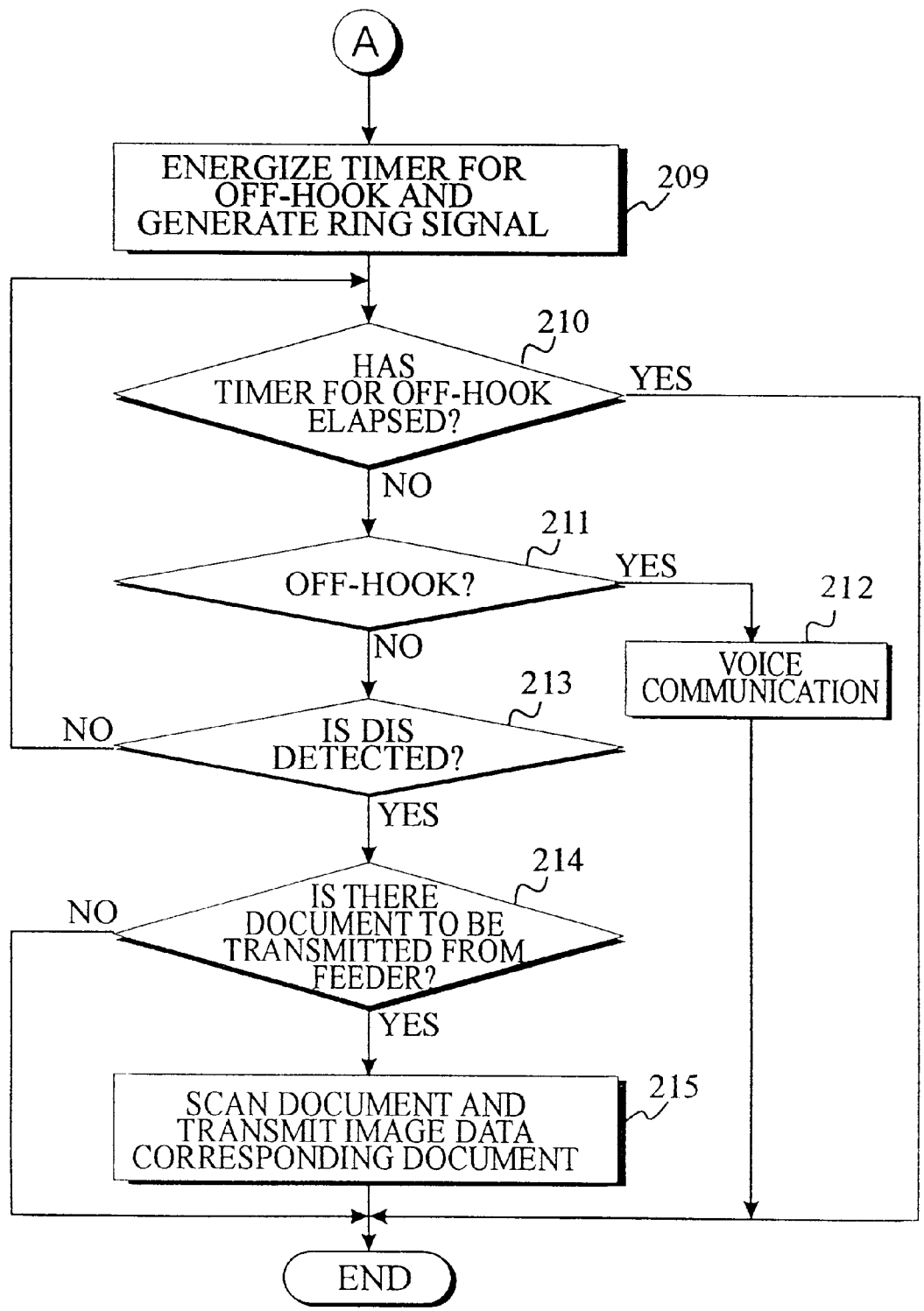

The facsimile equipment further includes a timer 120 that informs the CPU 111 of whether a period of time a user specifies goes by so that the CPU 111 can check if the ring-back tone and busy tone is continuously issued for the specified period of time or more and can determine the status of the receiving set, i.e. whether the receiving set is in manual reception mode or whether the line is busy. FIGS. 2A and 2B each show flow charts for describing the outgoing call reservation operation of a facsimile equipment in accordance with the present invention.

The CPU 111 checks (S201) if a user dials the number of a receiving facsimile set by pressing the appropriate numeric keys on the OPE 112, and when it determines that the user dials the number, it goes to step 202. The CPU 111 stores (S202) the number of the receiving facsimile set input using the keys on the OPE 112 in the memory unit 119, and energizes the modem 117 for dialing. The CPU 111 then determines (S203) if the facsimile goes on-hook, i.e. if the user presses a speaker key, or hangs up the phone. When the user hangs up the phone, the CPU 111 completes the program, and when he does not hang up the phone yet, it goes to step 204.

The CPU 111 determines (S204) if a call reservation setting signal is input to the facsimile by using an outgoing call reservation key on the OPE 112, and when the call reservation setting signal is not input thereto, it returns to step 203.

On the contrary, when the CPU 111 determines (S204) that the call reservation setting signal is input to the facsimile, it goes to step 205, and it establishes (S205) an outgoing call reservation mode and cuts the telephone line. The CPU 111 also energizes a redial timer of the timer 120 in order to count the interval at which redialing is done. When the CPU 111 determines that the time for redialing the number comes in, (S206) it goes to step 207. The CPU 111 reads (S207) the number of the receiving set previously stored in the memory unit 119 to perform dialing through the modem 117.

The CPU 111 determines (S208) if an output signal from the modem 117 is a busy tone. When the busy tone is detected, the CPU 111 returns to step 205 so that dialing can be done at intervals of redialing. When the busy signal is not detected, the CPU 111 proceeds to step 209 to energize an off-hook timer of the timer 120, and controls the modem 117 to produce a ring signal. The CPU 111 allows the ring signal to be emitted through a speaker 122.

If the CPU 111 determines (S210) that a predetermined period of time for off-hook elapses when the facsimile does not go off-hook for a predetermined period of time after the ring signal is generated in telephone mode. When the CPU 111 determines that the period of time for off-hook goes by, it completes the program, and if the period of time for off-hook does not elapse, it goes to step 211. The CPU 111 determines (S211) if the facsimile goes off-hook, using the NCU 118, and if so, it goes to step 212 to establish voice communication thereby completing the program.

When the CPU 111 determines (S211) that the facsimile does not go offhook, it goes to step 213 to detect the generation of a digital identification signal (DIS). If the CPU 111 determines that there is no DIS, it returns to step 210, and when the CPU 111 detects that there is DIS, it goes to step 214. The CPU 111 determines (S214) from the sensing unit 113 if there is a document to be transmitted on the facsimile feeder. If there is no document on the feeder, the CPU 111 completes the program, and if there is a document on the feeder, it goes to step 215. The CPU 111 energizes (S215) the scanner 114 for scanning the document, and transmits the corresponding encoded signals via the modem 117.

As described above, according to the present invention, when a user dials the number of a receiving facsimile set for document transmission or voice communication and the line is busy, the user can set an outgoing call reservation mode so that a transmission operation or voice communication can be performed or established automatically as soon as a receiving facsimile set completes reception of incoming documents or a receiver hangs up the phone. Therefore, the present invention can save the trouble of redialing the number of the receiving set repeatedly until the receiver answers the transmitter's call, and allows a document transmission or voice communication to be performed automatically as soon as the receiving set is ready for receiving.

Therefore, it should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. An outgoing call reservation system for a facsimile equipment, comprising:
   an outgoing call reservation key for establishing by a user an outgoing call reservation mode when a telephone line of a receiving facsimile set is busy, said outgoing call reservation mode being established by the user using said outgoing call reservation key separate from dialing a number of the receiving facsimile set;
   a tone detecting unit for detecting a signal of a predetermined cycle received through a telephone line;
   a memory unit for storing the number of the receiving facsimile set dialed by a transmitter; and
   a central processing unit for controlling the facsimile equipment to be in the outgoing call reservation mode by the user using said outgoing call reservation key when a busy-tone signal is detected by said tone detecting unit after dialing the number of the receiving facsimile set, for establishing a communication path between the transmitter and the receiving facsimile set by redialing the number stored in the memory unit at least at one interval of a predetermined time after the user establishing said outgoing call reservation mode, and for allowing a ring signal to be produced so that one of a document transmission and voice communication can be performed.

2. The outgoing call reservation system according to claim 1, wherein said signal of a predetermined cycle comprises a busy tone.

3. The outgoing call reservation system of claim 1, wherein the central processing unit redials the number stored in the memory unit repeatedly at intervals of a predetermined time.

4. An outgoing call reservation system for a facsimile equipment, comprising:

a first unit for entering, storing and dialing a number of a remote facsimile system;

a second unit for establishing an outgoing call reservation mode by a user using an outgoing call reservation key when the number of the remote facsimile system is dialed and a telephone line of the remote facsimile system is busy, said outgoing call reservation mode being established by the user using said outgoing call reservation key separate from dialing the number of the remote facsimile system;

a third unit for redialing at least at one predetermined time interval the number stored of the remote facsimile system when a time for redialing elapses while the telephone line is cut after the user establishing the outgoing call reservation mode;

a fourth unit for detecting a busy tone from the remote facsimile system after redialing the number stored of the remote facsimile system;

a fifth unit for detecting a digital identification signal from the remote facsimile system after redialing the number of the receiving facsimile set stored of the remote facsimile system; and a sixth unit for scanning a document and transmitting image data corresponding to said document to the remote facsimile system upon receipt of said digital identification signal.

5. The outgoing call reservation system of claim 4, further comprising a seventh unit for generating a dummy ring signal after redialing the number stored of the remote facsimile system.

6. The outgoing call reservation system of claim 5, further comprising an eighth unit for performing voice communication when the remote facsimile system goes off-hook after the dummy ring signal is generated by said seventh unit.

7. The outgoing call reservation system of claim 4, wherein the third unit redials the number stored of the remote facsimile system at a plurality of intervals of a predetermined time.

8. An outgoing call reservation method for a facsimile equipment, comprising the steps of:

entering, storing and dialing a number of a remote facsimile system;

establishing an outgoing call reservation mode by a user using an outgoing call reservation key when a telephone line of the remote facsimile system is busy, said outgoing call reservation mode being established by the user using said outgoing call reservation key separate from dialing the number of the remote facsimile system;

redialing at least at one predetermined time interval the number stored of the remote facsimile system when a time for redialing elapses while the telephone line is cut after the user establishing the outgoing call reservation mode;

generating a dummy ring signal after redialing the number stored of the remote facsimile system;

detecting whether the remote facsimile system goes off-hook; and performing voice communication when the remote facsimile system goes off-hook.

9. The outgoing call reservation method of claim 8, further comprising the steps of:

detecting a digital identification signal when a busy-tone signal is not detected after redialing the number stored for the remote facsimile system; and scanning a document and transmitting image data corresponding to said document to the remote facsimile system when said digital identification signal is detected.

10. The outgoing call reservation method of claim 8, wherein the redialing step redials the number stored of the remote facsimile system at a plurality of intervals of a predetermined time.

11. An outgoing call reservation method for a facsimile equipment, comprising the steps of:

entering, storing and dialing a number of a remote facsimile system;

establishing an outgoing call reservation mode by a user using an outgoing call reservation key when a telephone line of the remote facsimile system is busy, said outgoing call reservation mode being established by the user using said outgoing call reservation key separate from dialing the number of the remote facsimile system;

redialing at least at one predetermined time interval the number stored of the remote facsimile system when a time for redialing elapses while the telephone line is cut after the user establishing the outgoing call reservation mode;

detecting a digital identification signal when a busy tone is not detected after redialing the number stored of the remote facsimile system; and transmitting a document to the remote facsimile system when the digital identification signal is detected.

12. The outgoing call reservation method of claim 11, wherein the redialing step redials the number stored of the remote facsimile system at a plurality of intervals of a predetermined time.

* * * * *